US011233456B2

United States Patent
Basso et al.

(10) Patent No.: US 11,233,456 B2
(45) Date of Patent: Jan. 25, 2022

(54) METHODS AND SYSTEMS OF OPERATING POWER CONVERTERS

(71) Applicant: SEMICONDUCTOR COMPONENTS INDUSTRIES, LLC, Phoenix, AZ (US)

(72) Inventors: Christophe Basso, Venerque (FR); Yann Vaquette, Labastidette (FR); Joel Turchi, Gagnac sur Garonne (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/674,115

(22) Filed: Nov. 5, 2019

(65) Prior Publication Data
US 2021/0099092 A1     Apr. 1, 2021

Related U.S. Application Data

(60) Provisional application No. 62/907,795, filed on Sep. 30, 2019.

(51) Int. Cl.
*H02M 3/335*     (2006.01)
*H02M 1/08*     (2006.01)
*H02M 1/00*     (2006.01)

(52) U.S. Cl.
CPC ......... *H02M 3/33523* (2013.01); *H02M 1/08* (2013.01); *H02M 1/0009* (2021.05)

(58) Field of Classification Search
CPC ............... H02M 3/33523; H02M 1/08; H02M 2001/0009
See application file for complete search history.

(56) References Cited

U.S. PATENT DOCUMENTS 5,438,499 A     8/1995    Bonte et al.
7,463,497 B2    12/2008    Negrete
(Continued)

OTHER PUBLICATIONS

"iW1 677-00 for 5V 1A Ultra-Thin Charger Design," Product Brochure EBC10004, Apr. 2012, 9 pages, Copyright 2012 iWatt, Inc.
(Continued)

*Primary Examiner* — Thienvu V Tran
*Assistant Examiner* — Bart Iliya
(74) *Attorney, Agent, or Firm* — Dickinson Wright PLLC; Mark E. Scott (57) ABSTRACT

Operating power converters. Some of the methods include: storing energy in a transformer arranged for flyback operation, the storing by making conductive a primary switch coupled to a primary winding of the transformer; and then ceasing the storing of energy; determining on time of the primary switch during the storing of energy, the determining creates a value indicative of charge time; transferring energy from the transformer to a load through a secondary winding of the transformer; measuring discharge time of the energy from the transformer during the transferring, the measuring of the discharge time creates a value indicative of discharge time; calculating a value indicative of output voltage of the power converter using the value indicative of charge time and the value indicative of discharge time; and then compensating a charge time of a subsequent energy storage cycle, the compensation based on the value indicative of output voltage.

17 Claims, 6 Drawing Sheets

(56) References Cited

U.S. PATENT DOCUMENTS

| | | | |
|---|---|---|---|
| 2014/0268950 A1* | 9/2014 | Medina-Garcia | H02M 3/33507 363/78 |
| 2014/0285169 A1* | 9/2014 | Zhang | H05B 45/37 323/282 |
| 2017/0302184 A1* | 10/2017 | Chen | H02M 3/33523 |

OTHER PUBLICATIONS

"42VIN Micropower No-Opto Isolated Flyback Converter with 65V/1.2A Switch," Product Brochure LT8301, Apr. 2019, 24 pages, Copyright Analog Devices, Inc. 2014-2019.

Frank, Richard et al., "LM3001/LM3101 A 1 MHz Off-Line PWM Controller Chipset with Pulse Communication for Voltage-Current- or Charge-Mode Control," Application Note 918, Jan. 1994, 8 pages, Copyright 1995 National Semiconductor Corporation.

"Low Power Offline Constant Current & Constant Voltage Primary Side PWM Current-Mode Controller with/without High Voltage Startup Current Source," Publication No. NCP1360/D; Jun. 2018—Rev. 7; 29 pages, Copyright Semiconductor Components Industries, LLC 2016.

"Optocoupler-less Isolated Flyback Converter," Datasheet BD7F100HFN-LB BD7F100EFJ-LB, Apr. 17, 2017, Rev.003, 31 pages, Copyright ROHM Co., Ltd.

"ISO124±10-V Input, Precision Isolation Amplifier," Product Brochure ISO124, Sep. 1997—Revised Jun. 2018, 28 pages, Copyright 1997-2018, Texas Instruments Incorporated.

\* cited by examiner

METHODS AND SYSTEMS OF OPERATING POWER CONVERTERS

CROSS-REFERENCE TO RELATED APPLICATIONS

This application claims the benefit of U.S. Provisional Patent Application No. 62/907,795, filed on Sep. 27, 2019, the entire contents of which is incorporated herein by reference.

BACKGROUND

Switched power converters convert an input voltage to an output voltage. The power converter implements a feedback or regulation loop used to enable a stable and accurate output voltage or output current. The loop ensures output voltage or current regulation regardless of operating conditions.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

In relation to electrical devices, (whether stand alone or as part of an integrated circuit), the term "input" and "output" refer to electrical connections to the electrical devices, and shall not be read as verbs requiring action. For example, a differential amplifier (such as an operational amplifier) may have a first differential input and a second differential input, and these "input" define electrical connections to the operational amplifier, and shall not be read to require inputting signals to the operational amplifier.

"Controller" shall mean, alone or in combination, individual circuit components, an application specific integrated circuit (ASIC), a microcontroller with controlling software, a digital signal processor (DSP), a processor with controlling software, or a field programmable gate array (FPGA), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to methods and systems of operating power converters. More particularly, example embodiments are directed to power converters with isolation transformers that operate without the need to sense output voltage, such as sensing through an optocoupler or sensing through a dedicated auxiliary winding. Operating an example power converter includes regulating or compensating the timing of ending energy storage cycles to adjust for changes in output voltage in cases where output voltage is not directly measured. The specification now turns to an example system to orient the reader.

Figure 1:
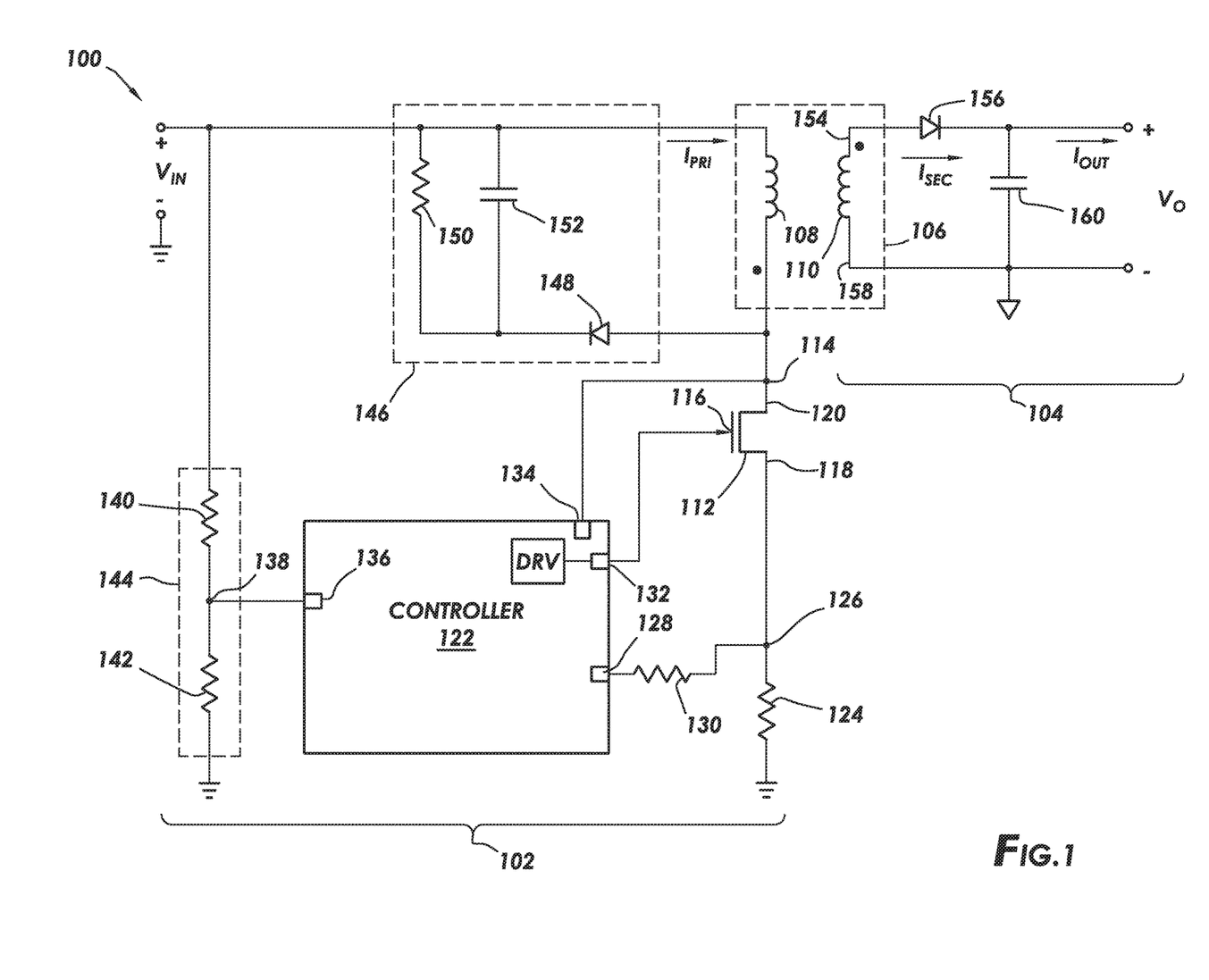
FIG. 1 shows a schematic diagram of a power converter in accordance with at least some embodiments.

FIG. 1 shows a schematic diagram of a switched power converter 100 (hereafter "power converter 100") in accordance with at least some embodiments. In particular, the power converter 100 comprises a primary side 102 galvanically isolated from a secondary side 104 by way of a transformer 106. The transformer 106 comprises a primary winding 108 and a secondary winding 110. A direct current (dc) input voltage $V_{in}$ is supplied to the power converter 100, and the power converter 100 creates a dc output voltage $V_O$, the output voltage $V_O$ in many cases lower than the input voltage $V_{in}$. The input voltage $V_{in}$ can also be created from an alternating current (ac) voltage source coupled to a rectifier (e.g., half- or full-wave rectifier) and a bulk capacitor.

The primary side 102 of the power converter 100 comprises the primary winding 108 of the transformer 106 and an electrically-controlled switch illustratively shown as a field effect transistor (FET, hereafter "primary FET 112") coupled to the primary winding 108. The primary winding 108 defines a first lead or connection coupled to the positive side of the input voltage $V_{in}$ and a second lead or connection of the primary winding 108 defines a switch node 114. In particular, the primary FET 112 defines a gate 116, a first connection or source 118, and a second connection or drain 120. The drain 120 couples to the switch node 114 and thus the second lead of the primary winding 108. In some cases the source 118 couples to a sense node 126 defined by a first lead of a sense resistor 124, and the second lead of the sense resistor 124 couples to a ground on the primary side 102. In other cases the sense resistor 124 may be omitted.

Still referring to FIG. 1, the example primary-side controller 122 defines a gate terminal 132, a current-sense terminal 128, a drain terminal 134, and a measurement terminal 136. The example current-sense terminal 128 is coupled to the sense node 126, such as by way of a resistor 130. The gate terminal 132 is coupled to the gate of the primary FET 112. The drain terminal 134 is coupled to the drain 120 of the primary FET 112. Although the primary FET 112 is illustrated outside the primary-side controller 122, in some examples the primary FET 112 is integrated into the primary-side controller 122. The example measurement terminal 136 is coupled to the input voltage $V_{in}$ by way of a voltage divider 144 comprising resistors 140 and 142. In particular, the voltage divider 144 includes a first lead of resistor 140 is coupled to the input voltage $V_{in}$, while a second lead of the resistor 140 defines a sense node 138. A first lead of the resistor 142 is coupled to the sense node 138, and the second lead of resistor 142 is coupled to ground on the primary side 102. The sense node 138 is coupled to the measurement terminal 136.

The example primary side 102 further comprises a clamping circuit 146 in the example form of a diode 148 having its anode coupled to the switch node 114, and a cathode. The cathode of the diode 148 couples to a parallel resistor-capacitor (RC) circuit comprising resistor 150 coupled in parallel with capacitor 152. The opposite end of the RC circuit couples to the input voltage $V_{in}$. As the name implies, the clamping circuit 146 reduces voltage spikes at switch node 114 caused by the leakage inductance of the primary winding 108 when the primary FET 112 turns off.

Still referring to FIG. 1, the secondary side 104 of the example power converter 100 comprises a secondary winding 110 of the transformer 106. A first connection or first lead 154 of the secondary winding 110 couples to the positive terminal of the output voltage $V_O$ by way of a rectifier illustratively shown as diode 156 (e.g., a secondary rectifier). In particular, the first lead 154 couples to the anode of the diode 156 and the cathode of the diode 156 couples to the positive terminal of the output voltage $V_O$. Thus, the example secondary side 104 implements passive rectification; however, in other cases the rectifier on the secondary side may be a synchronous rectifier (such as a FET and a secondary-side controller making the FET conductive and non-conductive to implement the rectification). The secondary winding 110 further defines a second connection or second lead 158 that couples to the negative terminal of the output voltage $V_O$. The secondary side 104 further comprises smoothing capacitor 160 coupled between the positive terminal of the output voltage $V_O$ and the negative terminal of the output voltage $V_O$.

The transformer 106 in the example power converter 100 is set up for flyback operation, and operates by storing energy in the primary inductance of the transformer 106 (e.g., by causing current flow in the primary winding 108) and then transferring energy stored in the transformer 106 to a load through the secondary winding 110. Thus, the transformer 106 can be said to operate in two cycles: an energy storage cycle, in which the primary FET 112 is conductive and energy is stored in the primary inductance of the transformer 106; and a discharge cycle in which the primary FET 112 is non-conductive and energy is transferred from the transformer to the load by way of the secondary winding 110. The energy storage cycle coincides with an "on time" noted as $t_{on}$ of the primary FET 112, while the discharge cycle coincides with a "discharge time" noted as $t_{off}$ when the primary FET 112 is non-conductive. These durations are linked to the switching period $T_{sw}$ by duty ratios $d_1$ and $d_2$ which may be defined as follows:

$$d_1 = t_{on}/T_{sw}; \text{ and} \tag{1}$$

$$d_2 = t_{off}/T_{sw}. \tag{2}$$

With respect to the energy storage cycle, when the primary FET 112 is conductive, electrical current flows from the input voltage $V_{in}$, through the primary winding 108, through the primary FET 112, and through the sense resistor 124 to ground on the primary side. Specifically, a primary-side current ($I_{PRI}$), also referred to herein as "primary current," flows in the primary winding 108 and acts to store energy. During periods of time when the primary FET 112 is conducting, a voltage is induced on the secondary winding 110 with a polarity as shown by the dot convention in FIG. 1. The polarity reverse biases the diode 156, and thus no current flows through the secondary winding 110 during the energy storage cycle. Once the primary FET 112 is made non-conductive (e.g., either in current-mode control or voltage-mode control), the energy storage cycle ends.

The example power converter 100 enters the discharge cycle when the primary FET 112 is made non-conductive. In the discharge cycle, the voltage induced on the secondary winding 110 forward biases the diode 156 and thus the diode 156 begins to conduct. The secondary winding 110 thus produces secondary-side current (i.e., $I_{SEC}$), also referred to herein as "secondary current." The secondary current through secondary winding 110 produces the output voltage $V_O$ and corresponding output current $I_{OUT}$. The output voltage $V_O$ and output current $I_{OUT}$ are applied to a load (not specifically shown).

Still referring to FIG. 1, the primary-side controller 122 implements a control loop for control of the output voltage $V_O$ without engaging additional circuitry, such as an auxiliary winding or other sensing circuits, to physically sense the output voltage $V_O$. In particular, an example primary-side controller 122 is configured to indirectly measure the output voltage $V_O$ (discussed more below), and make adjustments as needed to maintain a setpoint output voltage. In particular, the primary-side controller 122 determines values indicative of the output voltage. In some cases the primary-side controller 122 determines the values indicative of output voltage by creating or calculating a sensed output voltage $V_{out}$ that is an indirect measure of actual output voltage $V_O$. In other cases the primary-side controller 122 need not create the sensed output voltage $V_{out}$, but nevertheless determines the values indicative of output voltage (e.g., ratios of charge time and discharge time, as discussed more below).

During the energy storage cycle, the primary-side controller 122 asserts the gate terminal 132 (to make the primary FET 112 conductive) and energy is stored in the field of the transformer 106. In current-mode control, the primary-side controller 122 primary-side current ($I_{PRI}$) by way of the current-sense terminal 128 and current sense resistor 124. The primary-side controller 122 de-asserts the gate terminal 132, and thus the primary FET 112 is made non-conductive, when the primary-side current ($I_{PRI}$) reaches a peak current setpoint, thus ending the energy storage cycle. In voltage-mode control, the primary-side controller 122 creates the sensed output voltage $V_{OUT}$ and controls during each energy storage cycle based on a voltage error signal and a reference signal (e.g., a sawtooth reference voltage). In such embodiments the primary-side controller 122 de-asserts the gate terminal 132 when voltage error signal and the reference signal cross, thus ending the energy storage cycle.

Regardless of the trigger for ending the energy storage cycle, the primary-side controller 122 measures or creates a value indicative of charge time (e.g., duration of the energy storage cycle) using any suitable technique. For example, the primary-side controller 122 may measure the time between assertion of the gate terminal 132 and de-assertion of the gate terminal 132. As discussed in greater detail below, the primary-side controller 122 indirectly measures the output voltage $V_O$ based, at least in part, on the value indicative of charge time. The specification now turns to the discharge cycle.

When the energy storage cycle ends by the primary FET 112 becoming non-conductive, the voltage on the secondary winding 110 changes polarity and the current flows through the diode 156 to the load—the discharge cycle. In accordance with example embodiments, the primary-side controller 122 also determines the duration of the discharge cycle using any suitable technique. For example, when the power converter 100 is operated in a continuous conduction mode, the primary-side controller 122 may determine the duration of the discharge cycle by measuring the time between de-assertion of the gate of primary FET 112 at the end of the energy storage cycle, and re-assertion of the gate of the primary FET 112 at the beginning of the next energy storage cycle. That is, in the continuous conduction mode the secondary current in the discharge cycle does not reach zero before the next energy storage cycle begins, and thus the duration between de-assertion and re-assertion of the gate of the primary FET 112 is a measure of the duration of the discharge time.

When the power converter 100 is operated in a discontinuous conduction mode, the primary-side controller 122 may determine the duration of the discharge cycle by measuring the time between de-assertion of the gate of primary FET 112 at the end of the energy storage cycle and an event sensed by way of the drain terminal 134. That is, in the discontinuous conduction mode during the discharge cycle the primary FET 112 is non-conductive and the voltage at the drain 120 is the sum of the input voltage $V_{in}$ and voltage reflected across the transformer 106—a first voltage amount. At the end of the discharge cycle, as the current flow in the secondary winding 110 ceases, the voltage at the drain 120 drops to the input voltage $V_{in}$—a second voltage amount. Thus, the example primary-side controller 122 may determine the end-time of the discharge cycle by monitoring the voltage at the drain 120 and measuring a duration of the discharge cycle by measuring the time between de-assertion of the gate of the primary FET 112 and the point in time when the voltage at the drain 120 falls below a second threshold amount (e.g., the voltage at the drain 120 drops closer to input voltage $V_{in}$). Accordingly, the primary-side controller 122 creates a value indicative of discharge time by monitoring the voltage on the drain terminal 134 which is coupled to the drain 120. Regardless of how the duration of the discharge cycle is measured, the primary-side controller 122 uses the duration of the discharge cycle to determine a value indicative of output voltage, such as creating the sensed output voltage $V_{out}$ or determining a ratio of charge times and discharge times.

In the event value indicative of output voltage shows the output voltage is low, the primary-side controller 122 takes appropriate action in a subsequent energy storage cycle. For example, if the primary-side controller 122 is operating in current-mode control, the primary-side controller 122 increases a peak current setpoint used in a subsequent (e.g., immediately subsequent) energy storage cycle, which causes the energy storage cycle to have a longer duration. If the primary-side controller 122 is operating in the voltage-mode control, a voltage error value causes a subsequent (e.g., immediately subsequent) energy storage cycle to have a longer duration.

Oppositely, in the event value indicative of output voltage shows the output voltage is high, the primary-side controller 122 takes appropriate action in a subsequent energy storage cycle. For example, if the primary-side controller 122 is operating in current-mode control, the primary-side controller 122 decreases the peak current setpoint used in a subsequent (e.g., immediately subsequent) energy storage cycle, which causes the energy storage cycle to have a shorter duration. If the primary-side controller 122 is operating in the voltage-mode control, a voltage error value causes a subsequent (e.g., immediately subsequent) energy storage cycle to have a shorter duration.

In related-art devices that monitor the output voltage $V_O$, the primary-side controller measures the output voltage using additional circuitry, such as an auxiliary winding of the transformer or an optocoupler that is coupled to secondary side 104. However, in various embodiments described herein the primary-side controller 122 does not couple to the output voltage $V_O$ in such a way that the output voltage $V_O$ is directly monitored. Instead, in example embodiments, the primary-side controller 122 calculates a value indicative of output voltage using a value indicative of charge time and a value indicative of discharge time. The specification now turns to a mathematical explanation.

Figure 2:
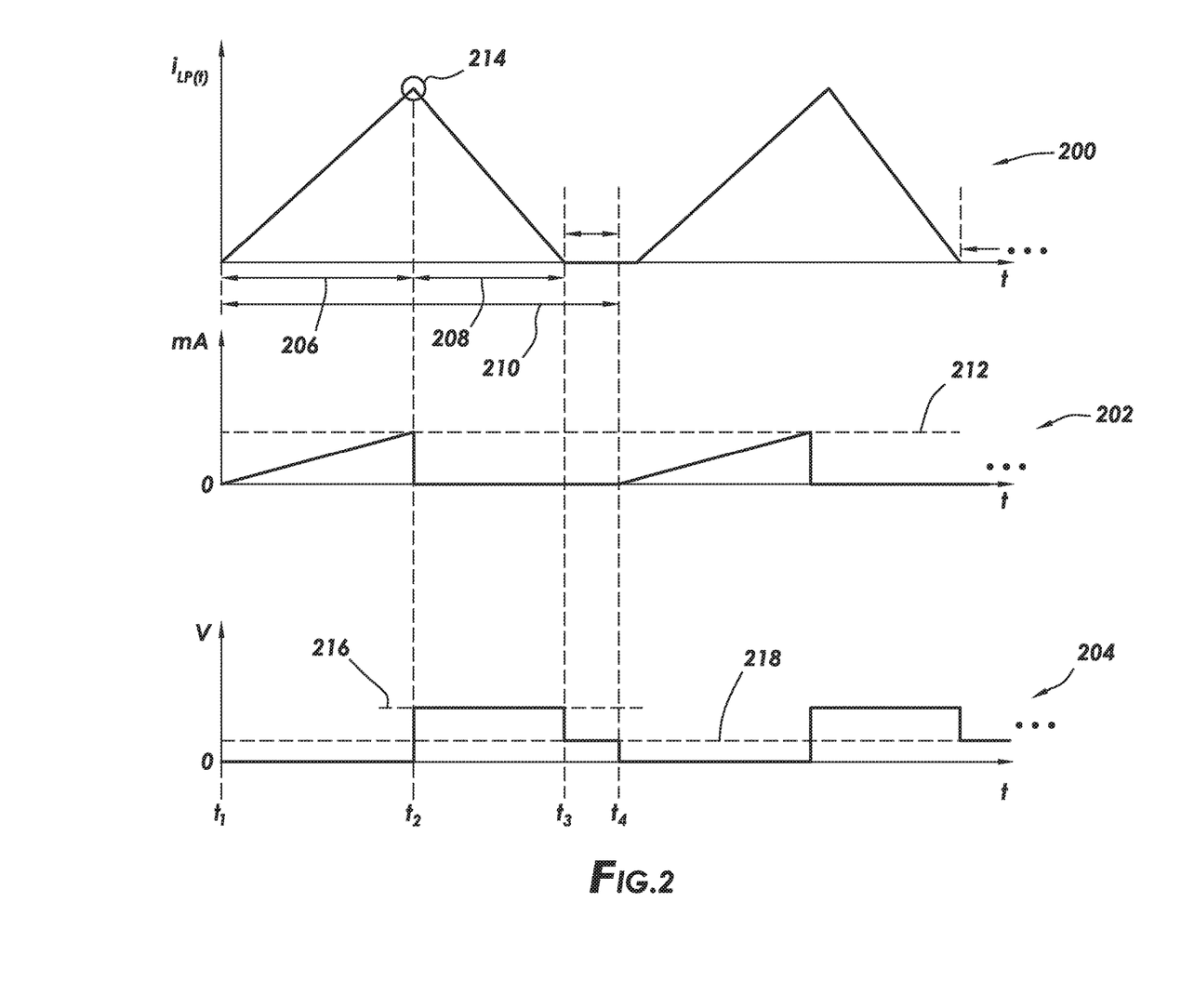
FIG. 2 shows a timing diagram in accordance with at least some embodiments.

In particular, if the voltage drop in diode 156 during the discharge time is neglected, the relationship of the output voltage $V_{out}$ to the input voltage $V_{in}$ may be shown as follows:

$$V_{out} = \frac{d_1}{d_2} \times NV_{in} \qquad (3)$$

where $d_1$ is the on-time duty ratio described above, $d_2$ is off-time duty ratio described above, and N is the turns ratio of the transformer 106. The particulars of the relationship between the charge time, the discharge time, the turns ratio, the input voltage, and the output voltage are discussed next in relation to FIG. 2. In particular, the mathematical relationships used to derive an output voltage without directly measuring the output voltage (e.g., Equation (3)) are described next.

FIG. 2 shows a timing diagram in accordance with at least some embodiments. In particular, FIG. 2 shows several signals plotted on corresponding time axes, including plot 200 showing current in the primary winding 108, plot 202 showing an example input current, and plot 204 showing an example voltage at the drain of the primary FET 112. Specific to the plots 200, 202, and 204, an example energy storage cycle 206 is defined between t1 and t2, while an example discharge cycle 208 is defined between t2 and t3. Additionally, a dead zone is defined between t3 and t4 where the dead zone occurs when the transformer 106 operates in a discontinuous conduction mode. Note that in continuous conduction mode (not specifically shown) the current in the secondary is still above zero when the next energy storage cycle beings. During the example dead zone, the primary FET 112 is non-conductive and the energy stored in the transformer 106 has fully collapsed or depleted. At time t4, the primary FET 112 is made conductive again to begin a subsequent energy storage cycle. The time between t1 and t4 defines a period 210 of the primary FET 112.

Specific to the plot 200, during the energy storage cycle 206, the current in the primary winding 108 increases at a rate illustrated. The rate of change of the current during the energy storage cycle 206 may be shown mathematically as:

$$S_{on} = \frac{V_{in}}{L_p} \qquad (4)$$

where $S_{on}$ is the rate of change of current in the primary winding 108 during the energy storage cycle 206, and $L_p$ is the inductance of the primary winding 108. Example units for $S_{on}$ are amps/second.

During the energy storage cycle 206, the current increases until it reaches a peak current 214, after which the primary FET 112 is made non-conductive and the discharge cycle 208 begins. In current-mode control, reaching the peak current 214 is the trigger for ending the energy storage cycle; however, in voltage-mode control a different trigger may be used to end the energy storage cycle, but nevertheless a peak current 214 is reached. During the energy storage cycle 206, the peak current 214 as a function of time may be shown mathematically as:

$$I_p = \frac{V_{in}}{L_p} d_1 T_{SW} \tag{5}$$

where $I_p$ is the current in the primary winding 108, $d_1 T_{SW}$ is the duration of the energy storage cycle 206, with $T_{SW}$ is the period of the primary FET 112 (e.g., period 210).

Still describing the plot 200, during the discharge cycle 208, the current in the primary winding 108 decreases. The rate of change of the current during the discharge cycle 208 may be shown mathematically as (still neglecting the voltage drop of diode 156):

$$S_{off} = \frac{V_{out}}{NL_p} \tag{6}$$

where $S_{off}$ is the rate of change of current in the primary winding 108 during the discharge cycle 208, and N is the turns ratio between the primary winding 108 and the secondary winding 110. During the discharge cycle, the current is initially at the peak current 214 and decreases as a function of time shown mathematically as:

$$I_p = \frac{V_{out}}{NL_p} d_2 T_{SW} \tag{7}$$

where $d_2 T_{SW}$ is the duration of the discharge cycle 208.

The output voltage $V_{out}$ may be sensed or reconstructed based on Equations 5 and 7. In particular, given the $I_P$ in each of Equations 5 and 7 are the same, the equations may be equated as follows:

$$\frac{V_{in}}{L_p} d_1 T_{SW} = \frac{V_{out}}{NL_p} d_2 T_{SW} \tag{8}$$

where the left side of Equation 8 represents peak current 214 using variables associated with the energy storage cycle 206, and the right side of Equation 8 represents the peak current 214 using variable associated with the discharge cycle 208.

By mathematical manipulation, the output voltage $V_{out}$ may be derived from Equation 8 to be:

$$V_{out} = \frac{d_1}{d_2} NV_{in}. \tag{9}$$

Accordingly, in some example embodiments the value indicative of output voltage is the sensed output voltage $V_{out}$ calculated based on Equation 9. Equation 9 can be rewritten as follows:

$$\frac{NV_{in}}{V_{out}} = \frac{d_2}{d_1}. \tag{10}$$

In other example embodiments, the value indicative of output voltage is the ratio $d_2/d_1$, and the primary-side controller 122 controls duration of each energy storage cycle in an attempt to maintain the equality of Equation 10.

Still referring to FIG. 2. Plot 202 illustrates an example input current. During the energy storage cycle 206, the primary FET 112 is made conductive, and current flows through the primary winding 108 ($I_{PRI}$ in FIG. 1), through the primary FET 112 and through the sense resistor 124. The corresponding drain voltage during the energy storage cycle 206 is illustrated in plot 204. As the primary FET 112 is conducting during the energy storage cycle 206, the drain voltage remains at zero. Once the energy storage cycle ends (e.g., the current reaches a peak current setpoint in current-mode control), the primary-side controller 122 makes the primary FET 112 non-conductive, and the discharge cycle 208 begins.

As the primary FET 112 is made non-conductive, the input current drops to zero (plot 202), while the drain voltage becomes the sum of the input voltage $V_{in}$ and voltage reflected across the transformer 106—the sum being a first voltage amount 216. The drain voltage remains around the first voltage amount 216 while current flows in the secondary winding 110. In the example discontinuous conduction mode shown, at some point the voltage created on the secondary winding 110 falls below the output voltage $V_O$, the diode 156 becomes reverse biased, and correspondingly the drain voltage drops (slightly before time t3).

At time t3, the current flow in the secondary winding 110 ceases, and the voltage reflected across the transformer 106 swings around zero. Moreover, at time t3, the drain voltage drops and oscillates around the input voltage $V_{in}$—a second voltage amount 218 (the oscillations not shown so as not to unduly complicate the figure). The drain voltage remains around the second voltage amount 218 until the primary-side controller 122 makes the primary FET 112 conductive in a subsequent energy storage cycle at time t4.

The example primary-side controller 122 measures the discharge time of the discharge cycle 208. In continuous conduction mode, the discharge time is the time between de-assertion of the primary FET 112 at the end of the energy storage cycle, and re-assertion of the primary FET 112 at the beginning of the next energy storage cycle. In the discontinuous conduction mode, the discharge time can be measured in several ways. The start of the discharge cycle can be determined as the de-assertion of the gate of the primary FET 112. In other cases, the start of the discharge cycle can be determined by sensing the voltage on the drain terminal 134 rise through a threshold amount (e.g., first voltage amount 216). Further during the discontinuous conduction mode, an end time of the discharge cycle may be determined based on the voltage on the drain terminal 134 falling below the second voltage amount 218. The specification now turns to a more detailed discussion of the primary-side controller 122.

Figure 3:
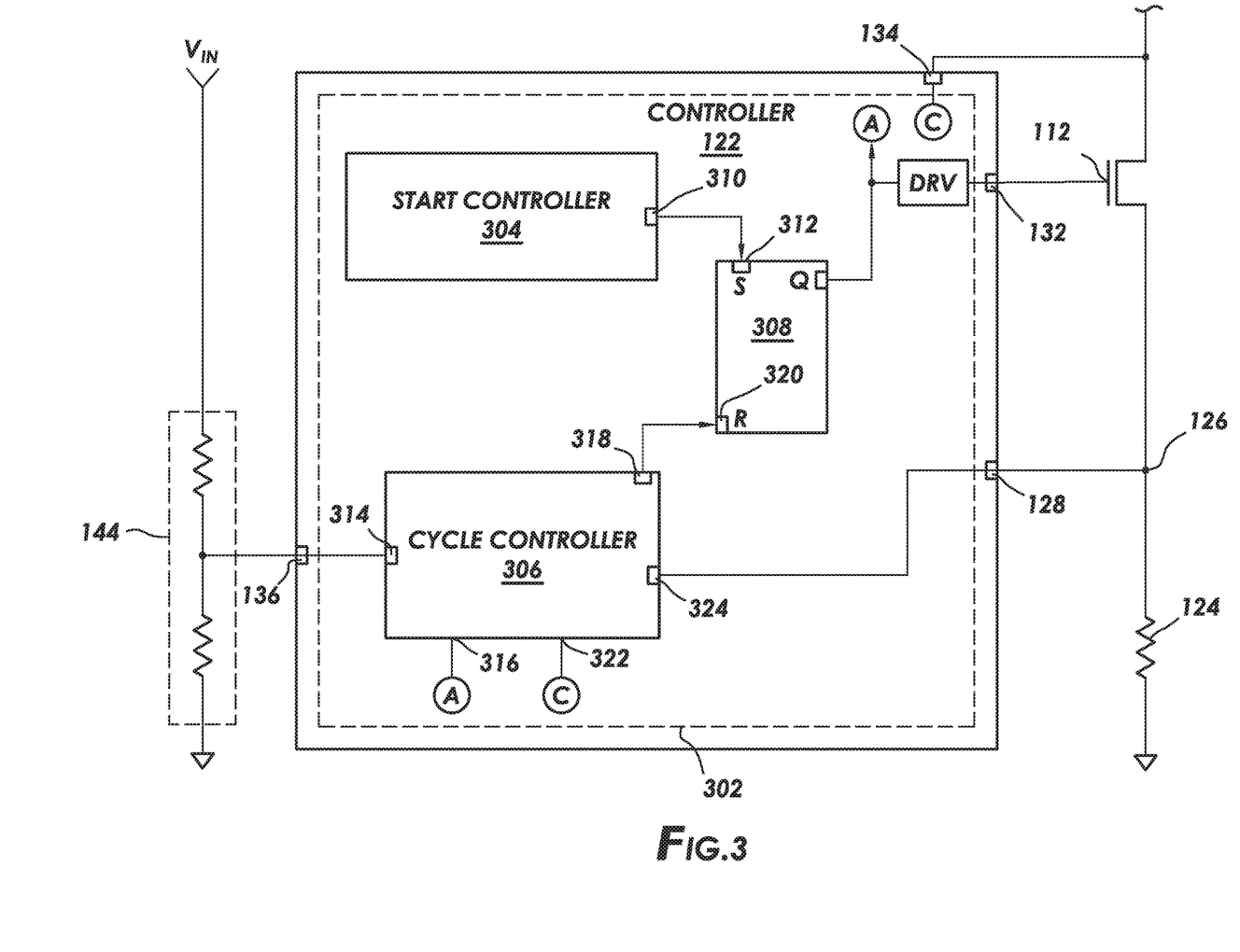
FIG. 3 shows a block diagram of a primary-side controller in accordance with at least some embodiments.

FIG. 3 shows a block diagram of a primary-side controller 122 in accordance with at least some embodiments. In particular, the primary-side controller 122 may comprise one or more electrical devices monolithically created on a substrate 302 and encapsulated within packaging; however, the functionality of the primary-side controller 122 may be embodied on multiple substrates co-packaged and electrically coupled to each other and the various terminals. The example packaged integrated circuit defines the gate terminal 132, the current-sense terminal 128, the measurement terminal 136, and the drain terminal 134. Other terminals would be present (e.g., ground or common terminal), but such additional terminals are not shown so as not to unduly complicate the figure.

The functionality of the primary-side controller 122 may be conceptually, though not necessarily physically, divided into a start controller 304, a cycle controller 306, and latch circuit 308. When operating a discontinuous conduction mode, the primary-side controller 122 may align making the primary FET 112 conductive in each cycle with voltage valleys of resonant oscillations of the voltage potential across the primary FET 112 in order to maintain zero voltage switching (ZVS), reduce acoustic noise generation, and improve light load efficiency. More specifically, when operating in the discontinuous conduction mode, the example start controller 304 can comprise circuitry configured to detect a "valley" in the voltage oscillations across the primary FET 112 occurring during the dead time (FIG. 2, defined between t3 and t4). When the start controller 304 detects an appropriate valley, the start controller 304 asserts the set output 310. An assertion of the set output 310 causes an assertion at the latch input 312 (e.g., a set input), which in turn propagates an assertion of the gate terminal 132 (by way of "DRV" block configured to drive voltages to the gate of the primary FET 112). The start controller 304 is configured to assert the gate terminal 132 at a switching frequency to create a plurality of consecutive energy storage cycles.

The example cycle controller 306 defines: a measurement input 314 coupled to the measurement terminal 136; a drive signal input 316 coupled to the gate terminal 132; a reset output 318 coupled to a reset input 320 of the latch circuit 308; a drain input 322 coupled to the drain terminal 134; and a current-sense input 324 coupled to the current-sense terminal 128. The example cycle controller 306 is configured to end each energy storage cycle. The description first turns to a ending each energy storage cycle when the primary-side controller 122 is operating in voltage-mode control.

Figure 4:
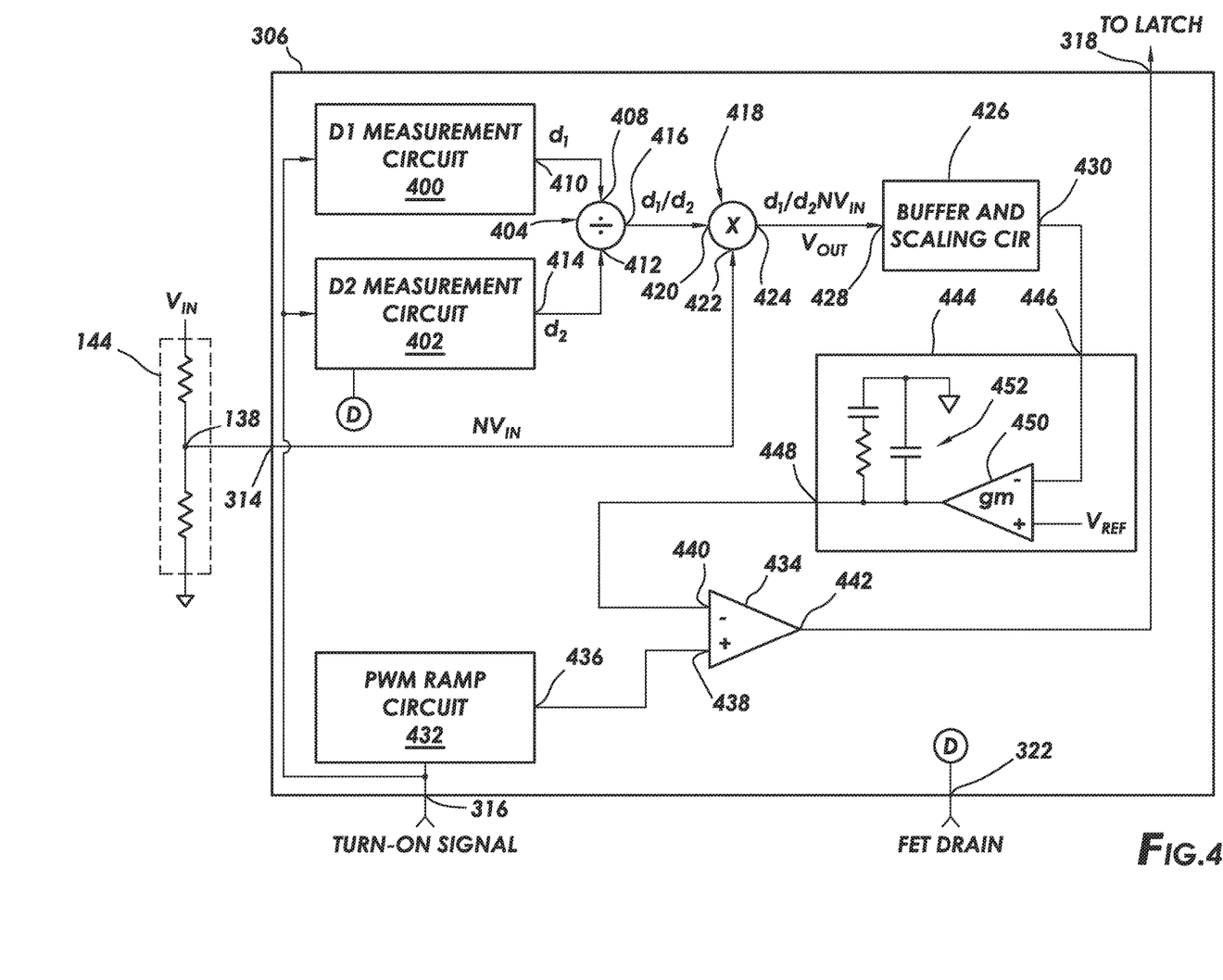
FIG. 4 shows a cycle controller in accordance with at least some embodiments.

FIG. 4 shows a cycle controller in accordance with at least some embodiments. In particular, FIG. 4 shows a cycle controller 306 illustratively operated in voltage-mode control. In voltage-mode control, the example cycle controller 306 creates or calculates a sensed output voltage $V_{OUT}$, and uses the sensed output voltage $V_{OUT}$ to control ending each energy storage cycle. More particularly still, in voltage-mode control, the example cycle controller 306 creates or calculates the sensed output voltage $V_{OUT}$ based on the relationship shown in Equation 9 above. To that end, the example cycle controller 306 defines a D1 measurement circuit 400, a D2 measurement circuit 402, a division node 404, and a multiplication node 406. Each will be addressed in turn.

The example D1 measurement circuit 400 couples to the drive signal input 316. As the name implies, the D1 measurement circuit 400 is designed and constructed to measure the on-time of each energy storage cycle, and produce a value indicative of duty ratio d1. Relatedly, the example D2 measurement circuit 402 couples to the drive signal input 316 and possibly other signals, such as the drain input 322 (as shown by the bubble "D"). As the name implies, the D2 measurement circuit 402 is designed and constructed to measure the off-time of discharge cycle, and produce a value indicative of the duty ratio d2.

In order to calculate the ratio d1/d2 in Equation 9 above, the values indicative of d1 and d2 are applied to the division node 404. In particular, the example division node 404 has a first input 408 coupled to the output 410 of the D1 measurement circuit 400. The example division node 404 has a second input 412 coupled to the output 414 of the D2 measurement circuit 402. The example division node 404 thus creates a signal or value indicative of the ratio of d1/d2 at its division output 416.

The next example step in creating the sensed output voltage $V_{OUT}$, as shown in Equation 9 above, is multiplying d1/d2 by the turns ratio N and the input voltage $V_{IN}$. In power converters operated as buck converters, the input voltage $V_{IN}$ is higher than output voltage $V_O$, and thus the turns ratio N is value less than one. It follows that in accordance with example embodiments the value of $NV_{IN}$ is created by selection of the resistance values of the voltage divider 144. The signal thus created at the sense node 138 of the voltage divider 144, and applied to the measurement input 314, is a signal having a magnitude directly proportional to $NV_{IN}$.

Multiplying d1/d2 by $NV_{IN}$ in the example cycle controller 306 is accomplished using a multiplication node 418. In particular, the multiplication node 418 defines a first input 420, a second input 422, and a product output 424. The first input 420 is coupled to the division output 416 of the division node 404. The second input 422 is coupled to the measurement input 314 and thus $NV_{IN}$. The multiplication node 418 produces at the product output 424 a signal whose magnitude is directly proportion to the product of d1/d2 and $NV_{IN}$. As shown by Equation 9 above, the product of d1/d2 and $NV_{IN}$ is the sensed output voltage $V_{OUT}$, which sensed output voltage $V_{OUT}$ is used in voltage-mode control to determine when to end each energy storage cycle.

Still referring to FIG. 4, the example cycle controller 306 further comprises an optional buffer and scaling circuit 426. The buffer and scaling circuit 426 defines an input 428 coupled to the product output 424, and a scaled output 430. The buffer and scaling circuit 426, as the name implies, may be used to scale the sensed output voltage $V_{OUT}$ up or down as desired, and may also provide buffering or smoothing to avoid sharp transitions in the sensed output voltage $V_{OUT}$. The further discussion refers the signal on the scaled output 430 as the sensed output voltage $V_{OUT}$; however, it will be understood that the sensed output voltage $V_{OUT}$ at the scaled output 430 may be scaled and smoothed.

The example cycle controller 306 further includes a voltage error circuit 444 defining a sense input 446 coupled to the scaled output 430, and an error output 448. The voltage error circuit 444 creates an error signal on the error output 448, the error signal proportional to the difference between a reference voltage $V_{REF}$ (e.g., the setpoint for the voltage output $V_O$) and the sensed output voltage $V_{OUT}$. The example voltage error circuit 444 creates the error signal by comparing the sensed output voltage $V_{OUT}$ to the reference voltage $V_{REF}$ by way of amplifier 450, though any suitable circuit may be used. While theoretically possible to use an instantaneous error signal in downstream components, the example voltage error circuit 444 also perform a smoothing or integrating function by way of an RC circuit 452.

In the example cycle controller 306 implementing voltage-mode control, the signal applied at the reset output 318 that ends each energy storage cycle may be created by comparing the error signal (created based on the sensed output voltage $V_{OUT}$) to a ramp signal. In particular, the example cycle controller 306 further comprises a pulse-width modulation (PWM) ramp circuit 432. The example PWM ramp circuit 432 couples to a signal indicative of the turn-on clock of the primary-side controller 122 in which the cycle controller 306 and PWM ramp circuit 432 are implemented. In the example case the FIG. 4, the signal indicative of the turn-on clock is shown as the turn-on signal applied at the drive signal input 316, but any suitable signal may be used. Based on the assertion of the turn-on signal in each switching period, the PWM ramp circuit 432 creates a ramp signal on the ramp output 436, where the ramp signal is synchronized to the turn-on signal. In example cases, the ramp signal is a sawtooth signal that begins a new ramp with each assertion of the turn-on signal applied to the drive signal input 316.

The example cycle controller 306 further comprises a comparator 434 that defines a non-inverting input 438 coupled to the ramp output 436, an inverting input 440 coupled to the error output 448, and a reset output 442. When the error signal on the inverting input 440 crosses the ramp signal on the non-inverting input 438, the comparator 434 asserts the reset output 442 which propagates to the latch circuit 308 (FIG. 3) and ends an energy storage cycle. Thus, in voltage-mode control the sensed output voltage $V_{OUT}$ is calculated and used to end each energy storage cycle, but again the sensed output voltage $V_{OUT}$ is created without measuring the actual output voltage $V_O$. Note also that in voltage-mode control sensing current through the sense resistor 124 (FIG. 3) is not used to end each energy storage cycle, and thus in cases where voltage-mode control is used the sense resistor 124 and related connections may be omitted. The description now turns to ending each energy storage cycle when the primary-side controller 122 is operating in current-mode control.

Figure 5:
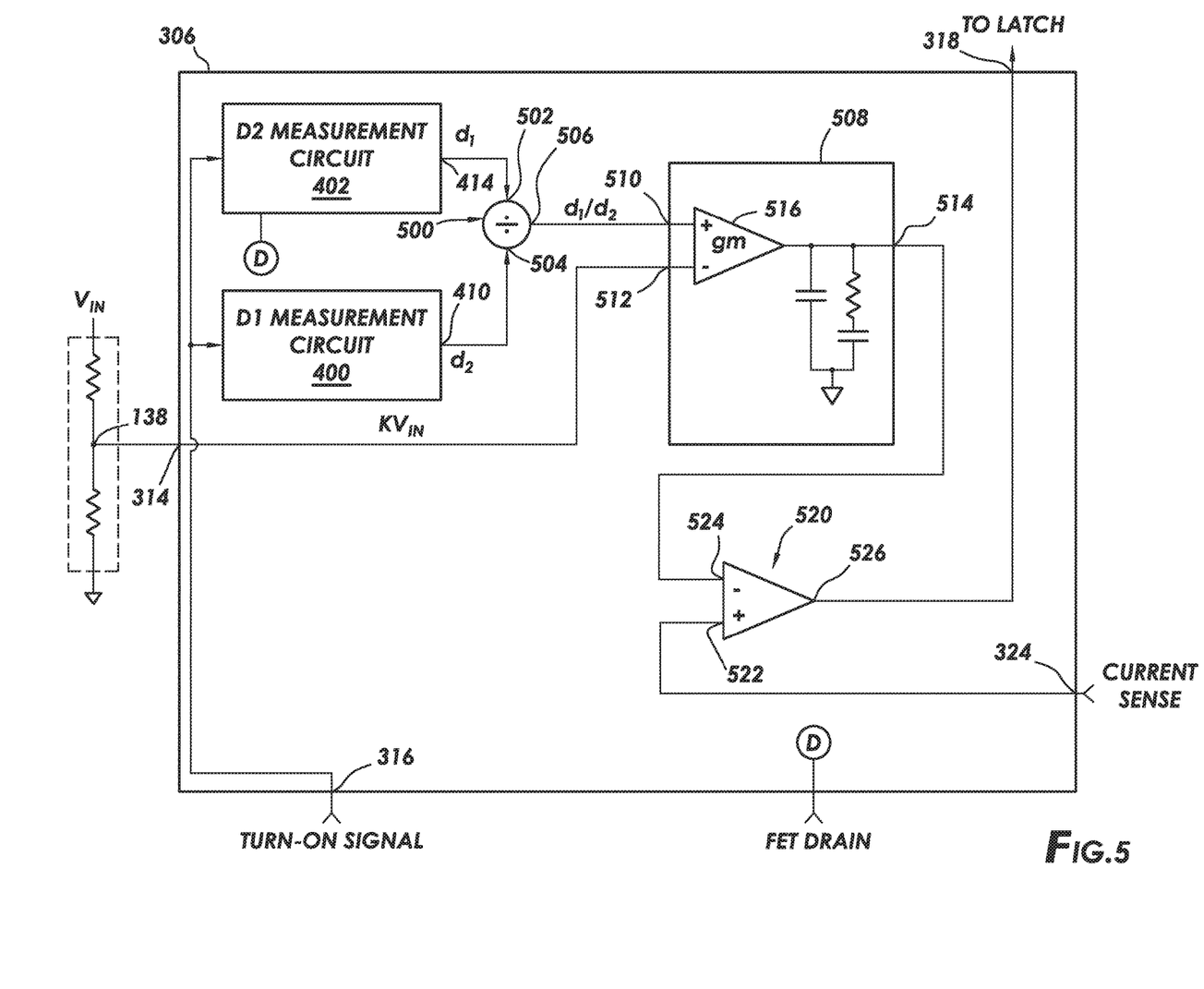
FIG. 5 shows a cycle controller in accordance with at least some embodiments.

FIG. 5 shows a cycle controller in accordance with at least some embodiments. In particular, FIG. 5 shows a cycle controller 306 illustratively operated in current-mode control. In current-mode control, the example cycle controller 306 does not fully calculate the sensed output voltage $V_{OUT}$; rather, in current-mode control the example cycle controller 306 makes adjustments to the duration of each energy storage cycle to maintain the equality of Equation 10 above, though the ratio of d2/d1 is proportional to the sensed output voltage $V_{OUT}$. More particularly still, in current-control mode the example cycle controller 306 creates a peak current setpoint for each energy storage cycle, the peak current setpoint being the primary current at which the energy storage cycle ends. To that end, the example cycle controller 306 defines the D1 measurement circuit 400, the D2 measurement circuit 402, and a division node 500. For reasons that will become more clear below, the position of the D1 measurement circuit 400 and the D2 measurement circuit 402 are swapped in FIG. 5 compared to FIG. 4, but the operation of each circuit is the same. So as not to unduly lengthen the discussion, the operation of the D1 measurement circuit 400 and the D2 measurement circuit 402 will not be repeated again here.

In order to calculate the ratio d2/d1 in Equation 10 above, the values indicative of d2 and d1 are applied to the division node 500. In particular, the example division node 500 has a first input 502 coupled to the output 414 of the D2 measurement circuit 402. The example division node 500 has a second input 504 coupled to the output 410 of the D1 measurement circuit 400. The example division node 500 thus creates a signal or value indicative of the ratio d2/d1 at its division output 506, where the ratio of d2/d1 can be considered a value indicative of output voltage.

As implied by Equation 10 above, in current-mode control the cycle controller 306 adjusts the duration of the energy storage cycle (e.g., adjusts the d1) to attempt to maintain the equality of Equation 10. For a given design of a power converter, the turns ratio N of the transformer is a constant. Moreover, for a given design of a power converter the setpoint output voltage is a constant, or is at least constant for extended periods of time during operation of the power converter. It follows that in the ratio $NV_{IN}/V_{OUT}$ only $V_{IN}$ may vary over short term operation, an thus the ratio may be stated as a $kV_{IN}$ where k is a constant (i.e., $N/V_{OUT}$). In power converters operated as buck converters, the input voltage $V_{IN}$ is higher than the actual output voltage $V_O$. It follows the turns ratio N is value less than one, and thus the constant k is a value less than one. It further follows that in accordance with example embodiments the value of $kV_{IN}$ is created by selection of the resistance values of the voltage divider 144. The signal thus created at the sense node 138 of the voltage divider 144, and applied to the measurement input 314, is a signal having a magnitude directly proportional to $kV_{IN}$ where k is equal to the ratio $N/V_{OUT}$.

Still referring to FIG. 5, the example cycle controller 306 further includes a voltage error circuit 508 defining a first ratio input 510 coupled to the division output 506, and a second ratio input 512 coupled to the measurement input 314, and an error output 514. The voltage error circuit 508 creates an error signal on the error output 514, the error signal proportional to the difference between the ratio d2/d1 produced by the division node 500 and $kV_{IN}$. The example voltage error circuit 508 creates the error signal by comparing the d2/d1 to $kV_{IN}$ by way of amplifier 516, though any suitable circuit may be used. While theoretically possible to use an instantaneous error signal in downstream components, the example voltage error circuit 508 also perform a smoothing or integrating function by way of an RC circuit 518.

In the example cycle controller 306 implementing current-mode control, the signal applied at the reset output 318 that ends each energy storage cycle may be created by comparing the error signal created by the voltage error circuit 508 to a sensed current signal on the current-sense input 324 (e.g., the current signal created by the sense resistor 124 (FIG. 1)). In particular, the example cycle controller 306 further comprises a comparator 520 that define defines a non-inverting input 522 coupled to the current-sense input 324, an inverting input 524 coupled to the error output 514, and a reset output 526. When the error signal on the inverting input 524 crosses the current sense signal on the non-inverting input 522, the comparator 520 asserts the reset output 526 which propagates to the latch circuit 308 (FIG. 3) and ends an energy storage cycle. Thus, in current-mode control a value indicative of output voltage is calculated (e.g., the ratio d2/d1) and is used to create a peak current setpoint used to end each energy storage cycle, and again all without measuring the actual output voltage $V_O$.

Figure 6:
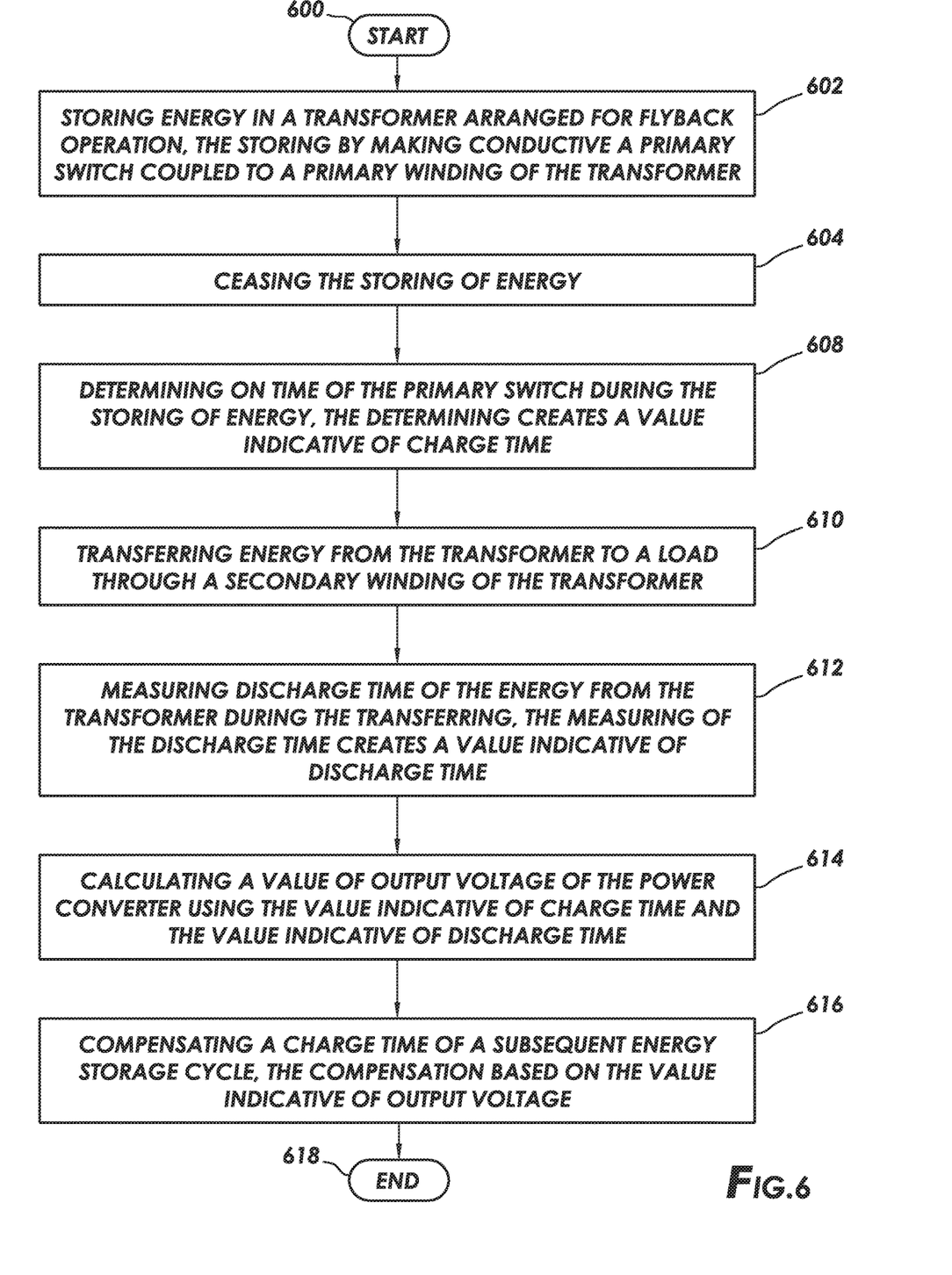
FIG. 6 shows a method in accordance with at least some embodiments.

FIG. 6 illustrates a method in accordance with at least some embodiments. In particular, the method starts (block 600) and includes: storing energy in a transformer arranged for flyback operation, the storing by making conductive a primary switch coupled to a primary winding of the transformer (block 602); and then ceasing the storing of energy (block 604); determining on time of the primary switch during the storing of energy, the determining creates a value indicative of charge time (block 608); transferring energy from the transformer to a load through a secondary winding of the transformer (block 610); measuring discharge time of the energy from the transformer during the transferring, the measuring of the discharge time creates a value indicative of discharge time (block 612); calculating a value indicative of output voltage of the power converter using the value indicative of charge time and the value indicative of discharge time (block 614); and then compensating a charge time of a subsequent energy storage cycle, the compensation based on the value indicative of output voltage (block 616). Thereafter the method ends (block 618).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power converter comprising:
   storing energy in a transformer arranged for flyback operation, the storing by making conductive a primary switch coupled to a primary winding of the transformer; and then ceasing the storing energy;
   determining on time of the primary switch during the storing energy, the determining creates a value indicative of charge time;
   transferring energy from the transformer to a load through a secondary winding of the transformer;
   measuring a discharge time of the energy from the transformer during the transferring, the measuring of the discharge time creates a value indicative of discharge time;
   calculating a value indicative of output voltage of the power converter using the value indicative of charge time and the value indicative of discharge time, the calculating without measuring an output voltage and without sensing through an auxiliary winding; and then
   compensating a charge time of a subsequent energy storage cycle, the compensation based on the value indicative of output voltage.

2. The method of claim 1, wherein determining the on time of the primary switch further comprises measuring the on time based on a drive signal provided to the primary switch.

3. The method of claim 1, wherein calculating the value indicative of output voltage further comprises calculating the value indicative of output voltage using a value indicative of an input voltage.

4. The method of claim 1, wherein calculating the value indicative of output voltage further comprises calculating the value indicative of output voltage based on a value indicative of input voltage and a turns ratio of the transformer.

5. The method of claim 1, wherein compensating the charge time in a subsequent energy storage cycle further comprises compensating the charge time in an immediately subsequent energy storage cycle.

6. The method of claim 1, wherein compensating the charge time in a subsequent energy storage cycle further comprises changing a peak current setpoint for a subsequent energy storage cycle, the peak current setpoint triggers the end of an energy storage cycle.

7. A primary-side controller for a power converter, the primary-side controller comprising:
   a gate terminal and a drain terminal;
   the primary-side controller configured to:
      assert the gate terminal; and then
      de-assert the gate terminal;
      create a value indicative of change time based on assertion of the gate terminal and de-assertion of the gate terminal;
      determine an end time of a discharge cycle based on a voltage on the drain terminal falling below a threshold amount;
      create a value indicative of discharge time of a discharge cycle based on the end time;
      calculate a value indicative of output voltage using the value indicative of charge time and the value indicative of discharge time; and
      compensate a charge time used in a subsequent de-assertion of the gate terminal based on the value indicative of output voltage.

8. The primary-side controller of claim 7, further comprising:
   a current-sense terminal; and
   wherein when the primary-side controller de-asserts the gate terminal, the primary-side controller is further configured to:
      measure a value indicative of primary current by way of the current-sense terminal; and
      de-assert the gate terminal when the value indicative of primary current reaches a peak current setpoint.

9. The primary-side controller of claim 7, wherein when the primary-side controller creates the value indicative of discharge time, the primary-side controller is further configured to determine a start time as at least one selected from a group comprising: a time at which the gate terminal is de-asserted; and at time at which a voltage on the drain terminal rises above predetermined threshold.

10. The primary-side controller of claim 7, wherein calculating the value indicative of output voltage is performed without measuring an output voltage.

11. The primary-side controller of claim 10, further comprising:
   a measurement terminal; and
   wherein when the primary-side controller calculates the value indicative of output voltage, the primary-side controller is further configured to:
      determine a ratio of the value indicative of charge time and the value indicative of discharge time; and
      calculate the value indicative of output voltage based on the ratio and a voltage on the measurement terminal indicative of input voltage and a turns ratio of a transformer.

12. A power converter comprising:
   a primary side comprising:
      a primary winding of a transformer;
      a primary field effect transistor (FET) coupled to the primary winding, the primary FET defining a gate, a drain, and a source;
      a primary-side controller defining a drain terminal coupled to the drain of the primary FET, a gate terminal, and a measurement terminal, the gate terminal coupled to the gate, and the measurement terminal coupled to an input voltage;

a secondary side comprising:
- a second winding of the transformer;
- a secondary rectifier coupled to the secondary winding and arranged for flyback operation;

wherein the primary-side controller is configured to:
- assert the gate terminal to create an energy storage cycle; and then
- de-assert the gate terminal to end the energy storage cycle;
- create a value indicative of charge time of the energy storage cycle;
- determine an end time of a discharge cycle based on a voltage on the drain terminal falling below a threshold amount;
- create a value indicative of discharge time of a discharge cycle based on the end time;
- calculate a value indicative of output voltage using the value indicative of charge time and the value indicative of discharge time; and
- compensate a charge time used in a subsequent de-assertion of the gate terminal based on the value indicative of output voltage.

13. The power converter of claim 12, wherein the primary-side controller further comprises:
- a current-sense terminal coupled to a sense node defined between the primary FET and a sense resistor; and
- wherein when the primary-side controller de-asserts the gate terminal, the primary-side controller is further configured to:
  - measure a value indicative of primary current by way of the current-sense terminal; and
  - de-assert the gate terminal when the value indicative of primary current reaches a peak current setpoint.

14. The power converter of claim 12, wherein when the primary-side controller creates the value indicative of discharge time, the primary-side controller is further configured to determine a start time as at least one selected from a group comprising: a time at which the gate terminal is de-asserted; and at time at which a voltage on the drain terminal rises above predetermined threshold.

15. The power converter of claim 12, wherein calculating the value indicative of output voltage is performed without measuring an output voltage.

16. The power converter of claim 15, wherein when the primary-side controller calculates the value indicative of output voltage, the primary-side controller is further configured to:
- determine a ratio of the value indicative of charge time and the value indicative of discharge time; and
- calculate the value indicative of output voltage based on the ratio and a voltage on the measurement terminal indicative of input voltage and a turns ratio of the transformer.

17. The power converter of claim 16 further comprising a voltage divider defining a node coupled to the measurement terminal, resistance of the voltage divider are indicative of a turns ratio of the transformer.

\* \* \* \* \*

UNITED STATES PATENT AND TRADEMARK OFFICE
CERTIFICATE OF CORRECTION

Page 1 of 1

PATENT NO. : 11,233,456 B2
APPLICATION NO. : 16/674115
DATED : January 25, 2022
INVENTOR(S) : Basso et al.

It is certified that error appears in the above-identified patent and that said Letters Patent is hereby corrected as shown below:

In the Claims

In Column 14, Line 7, Claim 7, delete "change" and insert -- charge --, therefor.

In Column 15, Line 2, Claim 12, delete "second" and insert -- secondary --, therefor.

Signed and Sealed this
Twelfth Day of April, 2022

Drew Hirshfeld
*Performing the Functions and Duties of the
Under Secretary of Commerce for Intellectual Property and
Director of the United States Patent and Trademark Office*